(12) United States Patent
Aoyama

(10) Patent No.: US 10,791,554 B2
(45) Date of Patent: Sep. 29, 2020

(54) DEVICE PROVIDED WITH A PLURALITY OF TYPES OF WIRELESS COMMUNICATION FUNCTIONS

(71) Applicant: Brother Kogyo Kabushiki Kaisha, Nagoya-shi, Aichi-ken (JP)

(72) Inventor: Kentaro Aoyama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 56 days.

(21) Appl. No.: 15/965,204

(22) Filed: Apr. 27, 2018

(65) Prior Publication Data

US 2018/0317227 A1   Nov. 1, 2018

(30) Foreign Application Priority Data

Apr. 28, 2017 (JP) ................................ 2017-090824

(51) Int. Cl.
| | |
|---|---|
| *H04W 72/04* | (2009.01) |
| *H04W 76/10* | (2018.01) |
| *H04W 72/02* | (2009.01) |
| *H04J 11/00* | (2006.01) |
| *H04B 1/715* | (2011.01) |
| *H04W 84/12* | (2009.01) |

(Continued)

(52) U.S. Cl.
CPC ..... *H04W 72/0453* (2013.01); *H04J 11/0023* (2013.01); *H04W 72/02* (2013.01); *H04W 76/10* (2018.02); *H04B 1/715* (2013.01); *H04B 2001/7154* (2013.01); *H04W 4/80* (2018.02); *H04W 84/12* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2006/0206592 A1 | 9/2006 | Fujii et al. | |
| 2009/0258607 A1* | 10/2009 | Beninghaus | H04B 1/3805 455/77 |
| 2015/0365986 A1* | 12/2015 | Lee | H04W 16/14 370/329 |

FOREIGN PATENT DOCUMENTS

| | | |
|---|---|---|
| JP | 2004-328269 A | 11/2004 |
| JP | 2008-172556 A | 7/2008 |

(Continued)

*Primary Examiner* — Adnan Baig
(74) *Attorney, Agent, or Firm* — Banner & Witcoff, Ltd.

(57) ABSTRACT

A device includes: a first wireless communication interface; a second wireless communication interface; a storage; and a controller. The controller is configured to perform: storing in the storage a center communication frequency of a second communication channel used for second wireless communications; determining a search target distribution, the search target distribution being a range defined by minimum and maximum communication frequencies among a plurality of communication frequencies, the plurality of communication frequencies being at least a part of a plurality of center communication frequencies stored in the storage and being separated from each other by less than a first frequency bandwidth occupied by each of a plurality of first channels; and determining a first communication channel from among at least one first channel satisfying a condition requiring that both minimum and frequencies of each of the at least one first channel be included in the search target distribution.

10 Claims, 12 Drawing Sheets

(51) Int. Cl.
*H04W 4/80* (2018.01)
*H04W 84/18* (2009.01)

(56) References Cited

FOREIGN PATENT DOCUMENTS

| | | | |
|---|---|---|---|
| JP | 2010-283503 | A | 12/2010 |
| JP | 2011-114768 | A | 6/2011 |

\* cited by examiner

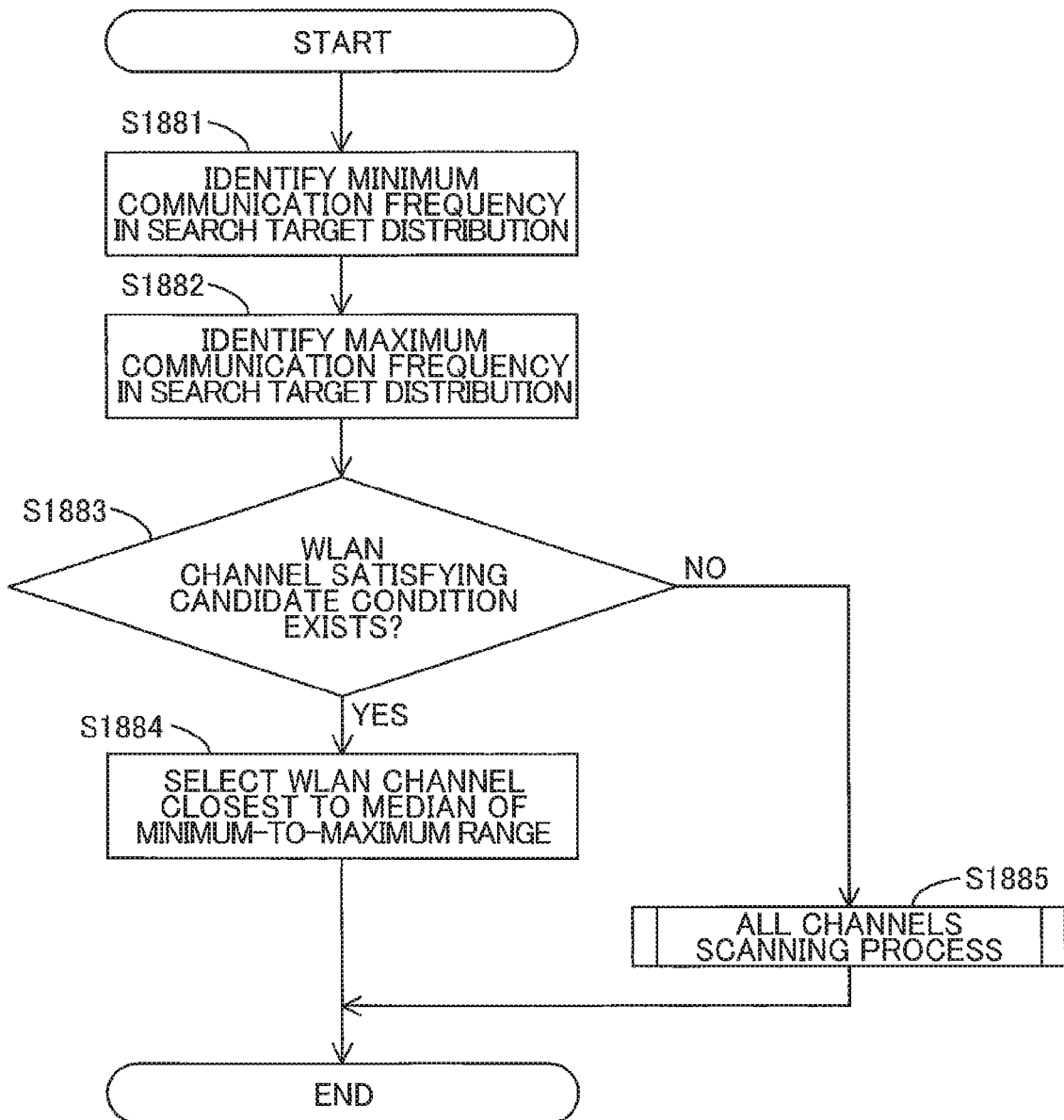

DEVICE PROVIDED WITH A PLURALITY OF TYPES OF WIRELESS COMMUNICATION FUNCTIONS

CROSS REFERENCE TO RELATED APPLICATION

This application claims priority from Japanese Patent Application No. 2017-090824 filed Apr. 28, 2017. The entire content of the priority application is incorporated herein by reference.

TECHNICAL FIELD

The present disclosure relates to an image-processing device that performs at least one of an image-forming process and an image-reading process. In the image-forming process, the image-processing device forms images on sheets on the basis of image data. In the image-reading process, the image-processing device reads an original to generate image data.

BACKGROUND

Wireless LAN (WLAN) communications and Bluetooth communications use the same 2.4 GHz frequency band, but their use of frequencies is different. That is, WLAN communications according to the IEEE 802.11 standard use a single fixed frequency channel among a plurality of channels in an occupied bandwidth of 20 MHz, while Bluetooth communications according to the IEEE 802.15.1 standard switch among a plurality of channels in an occupied bandwidth that is smaller than the bandwidth of channels in WLAN communications (frequency hopping).

Since both WLAN communications and Bluetooth communications use the 2.4 GHz frequency band, signal interference can occur when WLAN communications and Bluetooth communications are performed simultaneously in the vicinity of devices equipped with a WLAN communication function and a Bluetooth communication function. The Bluetooth communication function incorporates adaptive frequency hopping spread spectrum (AFH) in order to reduce such interference. AFH technology is used to detect a channel used for WLAN communications, generate a hopping pattern to avoid that channel, and perform frequency hopping according to this hopping pattern.

SUMMARY

Bluetooth has a maximum transfer rate of approximately 24 Mbps, which is slower than the transfer rate in WLAN communications. Accordingly, Bluetooth communications is primarily used for simple data transfers between a printer and a portable terminal such as a smartphone. However, if a need arises to transfer a large volume of data while communicating with Bluetooth, it is desirable to be able to switch from Bluetooth communications to WLAN communications.

Unfortunately, it can take time to search for a channel suitable for WLAN communications from among the plurality of channels.

In view of the foregoing, it is an object of the present disclosure to provide a device capable of reducing the time required to search for one first channel suitable for first wireless communications (WLAN) from among a plurality of first channels when switching from a connection according to second wireless communications (Bluetooth) to a connection using the first wireless communications.

In order to attain the above and other objects, the present disclosure provides device that includes: a first wireless communication interface; a second wireless communication interface; a storage; and a controller. The first wireless communication interface is configured to perform first wireless communications with an external device using a first communication channel. The first communication channel is determined from among a plurality of first channels. Each of the plurality of first channels occupies a first frequency bandwidth ranging from a minimum frequency to a maximum frequency within a predetermined frequency band. The second wireless communication interface is configured to perform second wireless communications with the external device using a second communication channel. The second communication channel is determined from and switched among a plurality of second channels depending on radio wave environment. Each of the plurality of second channels occupies a second frequency bandwidth smaller than the first frequency bandwidth within the predetermined frequency band. The second communication channel has a center communication frequency. The center communication frequency of the second communication channel is a median of the second frequency bandwidth occupied by the second communication channel. The controller is configured to perform: storing in the storage the center communication frequency of the second communication channel used for the second wireless communications and picked up every prescribed time interval while the second wireless communication interface is performing the second wireless communications with the external device, the storage being configured to store a plurality of center communication frequencies; determining a search target distribution, the search target distribution being a range defined by a minimum communication frequency and a maximum communication frequency within the predetermined frequency band, the minimum communication frequency being a minimum among a plurality of communication frequencies, the maximum communication frequency being a maximum among the plurality of communication frequencies, the plurality of communication frequencies being at least a part of the plurality of center communication frequencies stored in the storage and being separated from each other by less than the first frequency bandwidth; and determining the first communication channel from among at least one first channel satisfying a candidate condition, the candidate condition requiring that both the minimum frequency and the maximum frequency of each of the at least one first channel be included in the search target distribution.

BRIEF DESCRIPTION OF THE DRAWINGS

The particular features and advantages of the disclosure as well as other objects will become apparent from the following description taken in connection with the accompanying drawings, in which:

FIGS. 5A through 5C are explanatory diagrams for describing the channel selecting process illustrated in FIG. 4, in which FIG. 5A illustrates a plurality of WLAN channels ch-1 through ch-13 used for WLAN communications in frequency, FIG. 5B illustrates a sample distribution of Bluetooth communication frequencies that were stored in a RAM over time, and FIG. 5C illustrates a selection result of a WLAN channel used for WLAN communications in the channel selecting process illustrated in FIG. 4;

FIGS. 8A through 8C are explanatory diagrams for describing the channel selecting process illustrated in FIG. 7, in which FIG. 8A illustrates a plurality of WLAN channels ch-1 through ch-13 used for WLAN communications in frequency, FIG. 8B illustrates a sample distribution of Bluetooth communication frequencies that were stored in a RAM over time, and FIG. 8C illustrates a selection result of a WLAN channel used for WLAN communications in the channel selecting process illustrated in FIG. 7;

FIG. 9 is a flowchart illustrating steps in a third example of a channel selecting process executed by the MFP;

FIGS. 10A through 10C are explanatory diagrams for describing the channel selecting process illustrated in FIG. 9, in which FIG. 10A illustrates a plurality of WLAN channels ch-1 through ch-13 used for WLAN communications in frequency, FIG. 10B illustrates a sample distribution of Bluetooth communication frequencies that were stored in a RAM over time, and FIG. 10C illustrates a selection result of a WLAN channel used for WLAN communications in the channel selecting process illustrated in FIG. 9;

FIGS. 12A through 12C are explanatory diagrams for describing the channel selecting process illustrated in FIG. 11, in which FIG. 12A illustrates a plurality of WLAN channels ch-1 through ch-13 used for WLAN communications in frequency, FIG. 12B illustrates a sample distribution of Bluetooth communication frequencies that were stored in a RAM over time, and FIG. 12C illustrates a selection result of a WLAN channel used for WLAN communications in the channel selecting process illustrated in FIG. 11.

DETAILED DESCRIPTION

Next, embodiments of the present disclosure will be described in detail while referring to the accompanying drawings.

Structure of System

Figure 1:
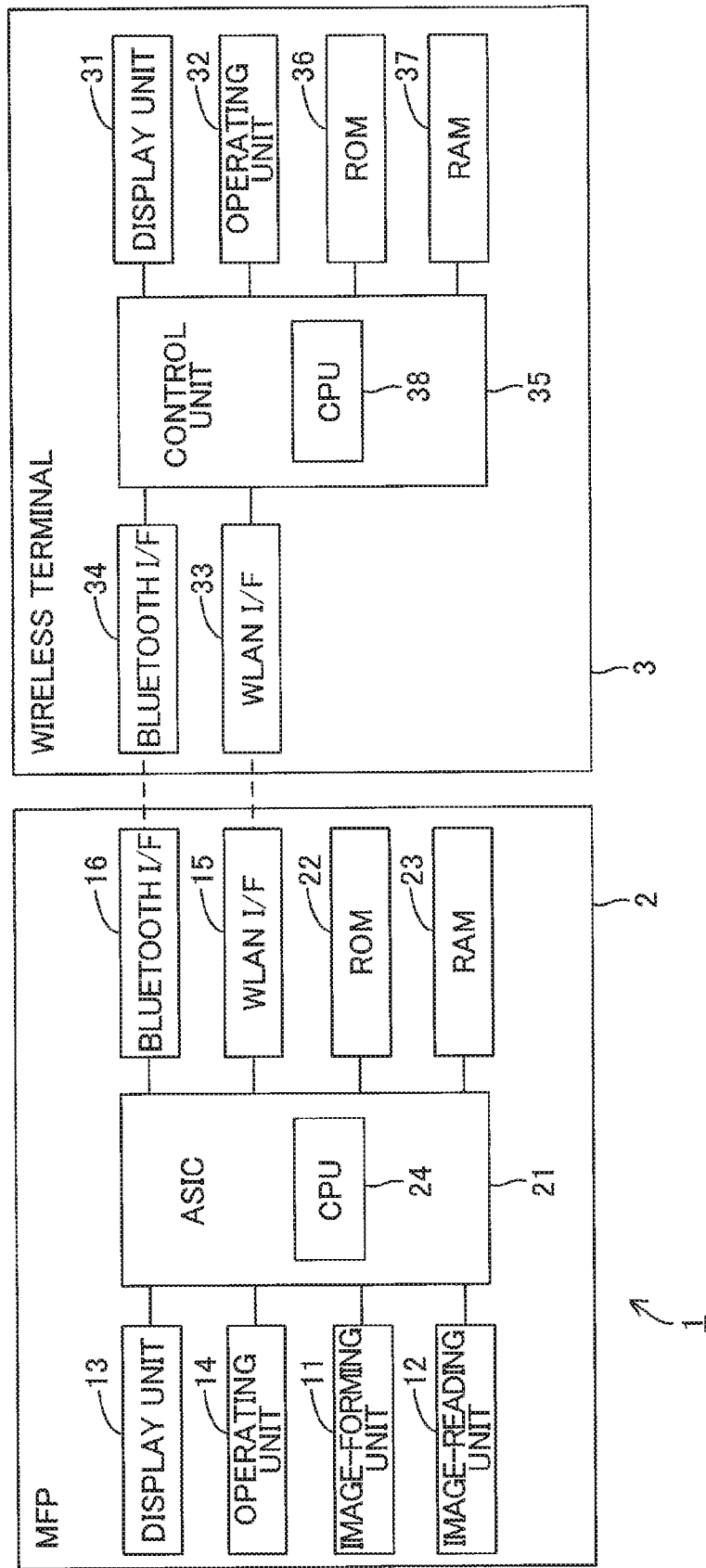
FIG. 1 is a block diagram illustrating a structure of a system including a multifunction peripheral (MFP) according to the present disclosure.

A system 1 illustrated in FIG. 1 includes a multifunction peripheral (MFP) 2, and a wireless terminal 3.

The MFP 2 (an example of the device) possesses a plurality of functions, such as an image-forming function for forming images on printing paper or other sheets on the basis of image data, and an image-reading function for generating image data by reading an image.

The wireless terminal 3 is a smartphone or a tablet computer, for example.

Both the MFP 2 and wireless terminal 3 are equipped with a wireless LAN (WLAN) communication function employing the IEEE 802.11 standard, and a Bluetooth communication function employing the IEEE 802.15.1 standard.

While both WLAN communications and Bluetooth communications use the same 2.4 GHz frequency band ranging from 2.4 GHz to 2.4835 GHz in frequency, their method of using frequencies differs. Specifically, on one hand, WLAN communications use a single fixed channel among a plurality of WLAN channels having an occupied bandwidth of 20 MHz, for example, 13 WLAN channels ch-1 through ch-13 within which center frequencies of the occupied bandwidth for two neighboring WLAN channels are separated by 5 MHz. On the other hand, Bluetooth communications use adaptive frequency hopping spread spectrum (AFH) technology to switch channels over the course of time among 40 Bluetooth channels in an occupied bandwidth of 2 MHz, while avoiding frequencies occupied by other wireless stations (frequency-hopping spread spectrum). Further, the transfer rate in Bluetooth communications is a maximum 24 Mbps, which is slower than the transfer rate of WLAN communications.

The MFP 2 also has an image-forming unit 11 (an example of the image processor), an image-reading unit 12 (an example of the image processor), a display unit 13, an operating unit 14, a WLAN interface (WLAN I/F) 15 (an example of the first wireless communication interface), and a Bluetooth interface (Bluetooth I/F) 16 (an example of the second wireless communication interface).

The image-forming unit 11 forms images (color or monochrome images) on the basis of image data onto sheets conveyed one at a time along a conveying path in the MFP 2. The method of image formation may be the electrophotographic method or the inkjet method.

The image-reading unit 12 reads an image formed on a sheet and outputs image data for that image. Image reading may be done according to the contact image sensor (CIS) method, for example.

The display unit 13 is a liquid crystal display unit, for example.

The operating unit 14 is provided with operating keys (for example, a start key, the ten numerical keys, cursor keys, and a return key). Through operations on the operating keys, the user can input various commands and the like into the operating unit 14. Note that the operating unit 14 may also be configured of touch keys superimposed over the display unit 13.

The WLAN interface 15 is provided with a circuit, an antenna, and the like required for WLAN communications.

The Bluetooth interface 16 is provided with a circuit, an antenna, and the like required for Bluetooth communications.

The MFP 2 is also provided with an application-specific integrated circuit (ASIC) 21, a read-only memory (ROM) 22, and a random access memory (RAM) 23 (an example of the storage).

The image-forming unit 11, image-reading unit 12, display unit 13, operating unit 14, WLAN interface 15, Bluetooth interface 16, ROM 22, and RAM 23 are all electrically connected to the ASIC 21. The ASIC 21 has a built-in central processing unit (CPU) 24 (an example of the controller). The CPU 24 executes programs for implementing various processes on the basis of information inputted into the ASIC 21. When executing these programs, the CPU 24 controls operations of the image-forming unit 11, image-reading unit 12, display unit 13, WLAN interface 15, Bluetooth interface 16, and other components.

The ROM 22 stores programs executed by the CPU 24, various data, and the like.

The RAM 23 is used as a work area when the CPU 24 executes programs. The RAM 23 also temporarily stores image data for images that the image-forming unit 11 will form on sheets, image data read by the image-reading unit 12, data to be transferred by the WLAN interface 15 and Bluetooth interface 16, and the like.

The wireless terminal 3 has a display unit 31, an operating unit 32, a WLAN interface (WLAN I/F) 33, a Bluetooth interface (Bluetooth I/F) 34, a control unit 35, a read-only memory (ROM) 36, and a random access memory (RAM) 37.

The display unit 31 is a liquid crystal display unit, for example.

The operating unit 32 is configured of touch keys superimposed over the display unit 31, for example.

The WLAN interface 33 is provided with a circuit, an antenna, and the like required for WLAN communications.

The Bluetooth interface 34 is provided with a circuit, an antenna, and the like required for Bluetooth communications.

The display unit 31, operating unit 32, WLAN interface 33, Bluetooth interface 34, ROM 36, and RAM 37 are all electrically connected to the control unit 35. The control unit 35 has a built-in central processing unit (CPU) 38. The CPU 38 executes programs for implementing various processes on the basis of information inputted into the control unit 35. When executing these programs, the CPU 38 controls operations of the display unit 31, WLAN interface 33, Bluetooth interface 34, and other components.

The ROM 36 stores programs executed by the CPU 38, various data, and the like.

The RAM 37 is used as a work area when the CPU 38 executes programs. The RAM 23 also temporarily stores data to be transferred by the WLAN interface 15 and Bluetooth interface 16, and the like.

Main Process

Figure 2:
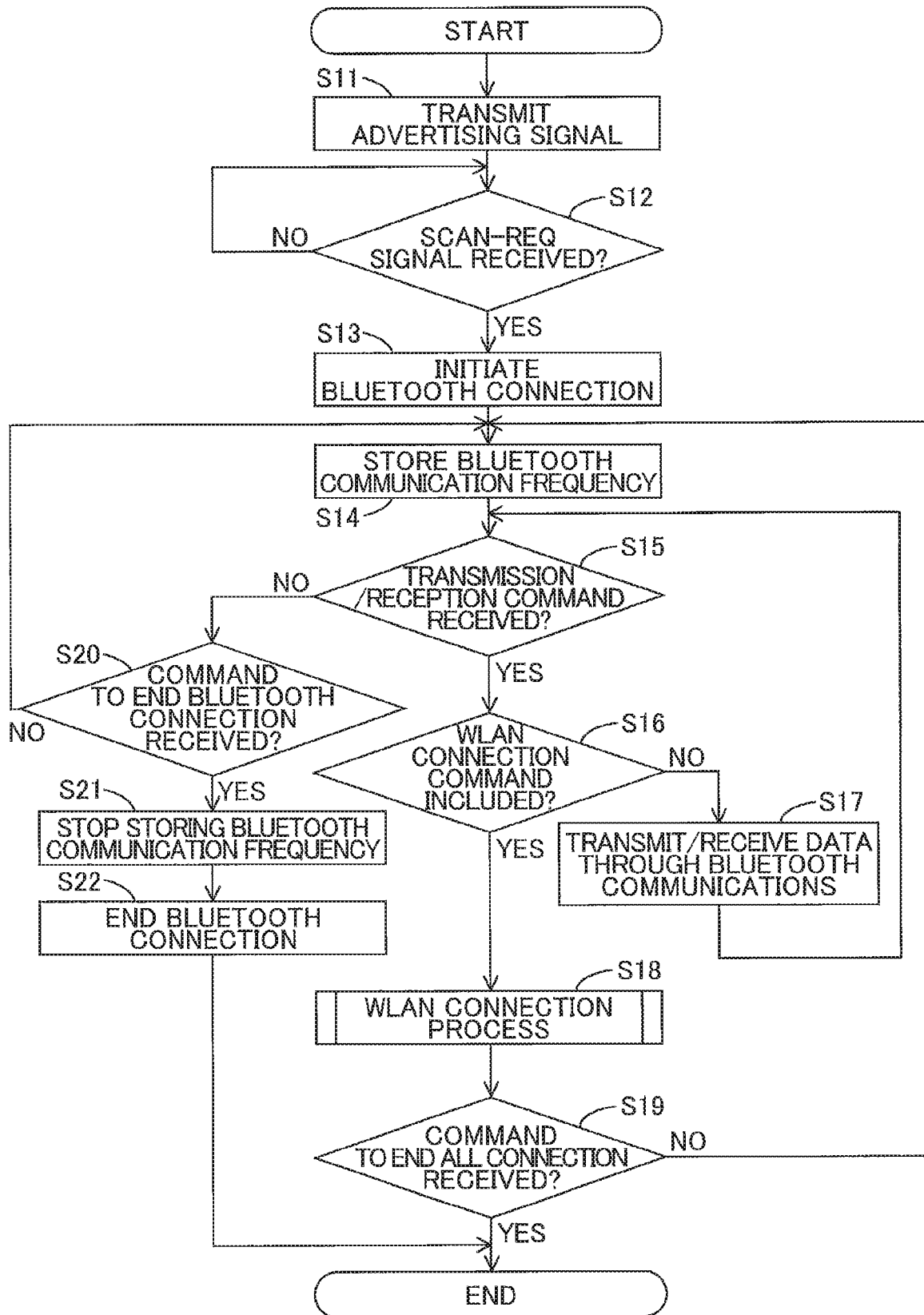
FIG. 2 is a flowchart illustrating steps in a main process executed by the MFP.

The CPU 24 built into the ASIC 21 of the MFP 2 executes a main process illustrated in FIG. 2 while power to the MFP 2 is on.

In S11 of the main process, the CPU 24 controls the Bluetooth interface 16 to transmit an advertising signal. The advertising signal is an example of the searching signal.

After transmission of the advertising signal, the CPU 24 waits for receiving a scan request (Scan-Req) signal. The scan request signal is an example of the response signal. Specifically, in S12 the CPU 24 determines whether the Bluetooth interface 16 has received a scan request signal and repeats this determination while a scan request signal has not been received (S12: NO).

Upon receiving the advertising signal, the wireless terminal 3 transmits a scan request signal to the MFP 2. When the Bluetooth interface 16 receives the scan request signal (S12: YES), in S13 the CPU 24 uses the Bluetooth interface 16 to initiate a connection (pairing) according to Bluetooth communications between the wireless terminal 3 that transmitted the scan request signal and the MFP 2.

Once a connection according to Bluetooth communications (hereinafter called a "Bluetooth connection") has been established between the MFP 2 and wireless terminal 3, in S14 the CPU 24 stores the center frequency of the Bluetooth channel (hereinafter called the "Bluetooth communication frequency") used for Bluetooth communications with the wireless terminal 3 in the RAM 23 while the channel is switched over time. Thereafter the CPU 24 accumulates the Bluetooth communication frequencies used at the current point in time after each prescribed interval elapsed in the RAM 23.

If the Bluetooth interface 16 subsequently receives a transmission/reception command from the wireless terminal 3 (S15: YES), in S16 the CPU 24 determines whether the transmission/reception command includes a WLAN connection command. The transmission/reception command is a command to either transmit data of various types from the wireless terminal 3 to the MFP 2 or a command to receive data transmitted from the MFP 2 to the wireless terminal 3. A WLAN connection command is a command to establish a connection according to WLAN communications (hereinafter called a "WLAN connection") between the MFP 2 and wireless terminal 3.

If the transmission/reception command does not include a WLAN connection command (S16: NO), in S17 the CPU 24 controls the Bluetooth interface 16 to transmit or receive data with the Bluetooth interface 34 of the wireless terminal 3 according to Bluetooth communications. For example, when the wireless terminal 3 issues a command to execute a print job with the image-forming function of the MFP 2, data for various settings required to execute this print job (sheet size and number of copies, for example) is exchanged between the wireless terminal 3 and MFP 2. At this time, Bluetooth communications can be used since the data size is relatively small.

When the transmission/reception command includes a WLAN connection command (S16: YES), in S18 the CPU 24 executes a WLAN connection process. The WLAN connection process is a process for establishing a WLAN connection between the MFP 2 and wireless terminal 3 in order to transmit or receive data through WLAN communications. For example, when the wireless terminal 3 issues a command to execute a print job with the image-forming function of the MFP 2, image data for the print job must be transferred from the wireless terminal 3 to the MFP 2. In this case, it is preferable to use WLAN communications since the data size is relatively large. The WLAN connection process will be described later in greater detail.

After completing the WLAN connection process, in S19 the CPU 24 determines whether the Bluetooth interface 16 received a command from the wireless terminal 3 to end all connections (both WLAN and Bluetooth connections) between the MFP 2 and wireless terminal 3. If a command to end all connections was received (S19: YES), the CPU 24 temporarily ends the main process and starts a new main process.

However, if the Bluetooth interface 16 did not receive a command to end all connections from the wireless terminal 3 after completing the WLAN connection process (S19: NO), the CPU 24 maintains the Bluetooth connection between the MFP 2 and wireless terminal 3 and in S14 continues to store the Bluetooth communication frequency in the RAM 23.

On the other hand, if the Bluetooth interface 16 has not received a transmission/reception command from the wireless terminal 3 while a Bluetooth connection is established between the MFP 2 and wireless terminal 3 (S15: NO), in S20 the CPU 24 determines whether the Bluetooth interface 16 received a command from the wireless terminal 3 to end the Bluetooth connection.

While the Bluetooth interface 16 has not received a command from the wireless terminal 3 to end the Bluetooth connection (S20: NO), in S14 the CPU 24 continues storing the Bluetooth communication frequency in the RAM 23.

If the Bluetooth interface 16 has received a command from the wireless terminal 3 to end the Bluetooth connection (S20: YES), in S21 the CPU 24 stops storing the Bluetooth communication frequencies in the RAM 23.

In S22 the CPU 24 ends the Bluetooth connection between the MFP 2 and wireless terminal 3 and quits the main process.

WLAN Connection Process

Figure 3:
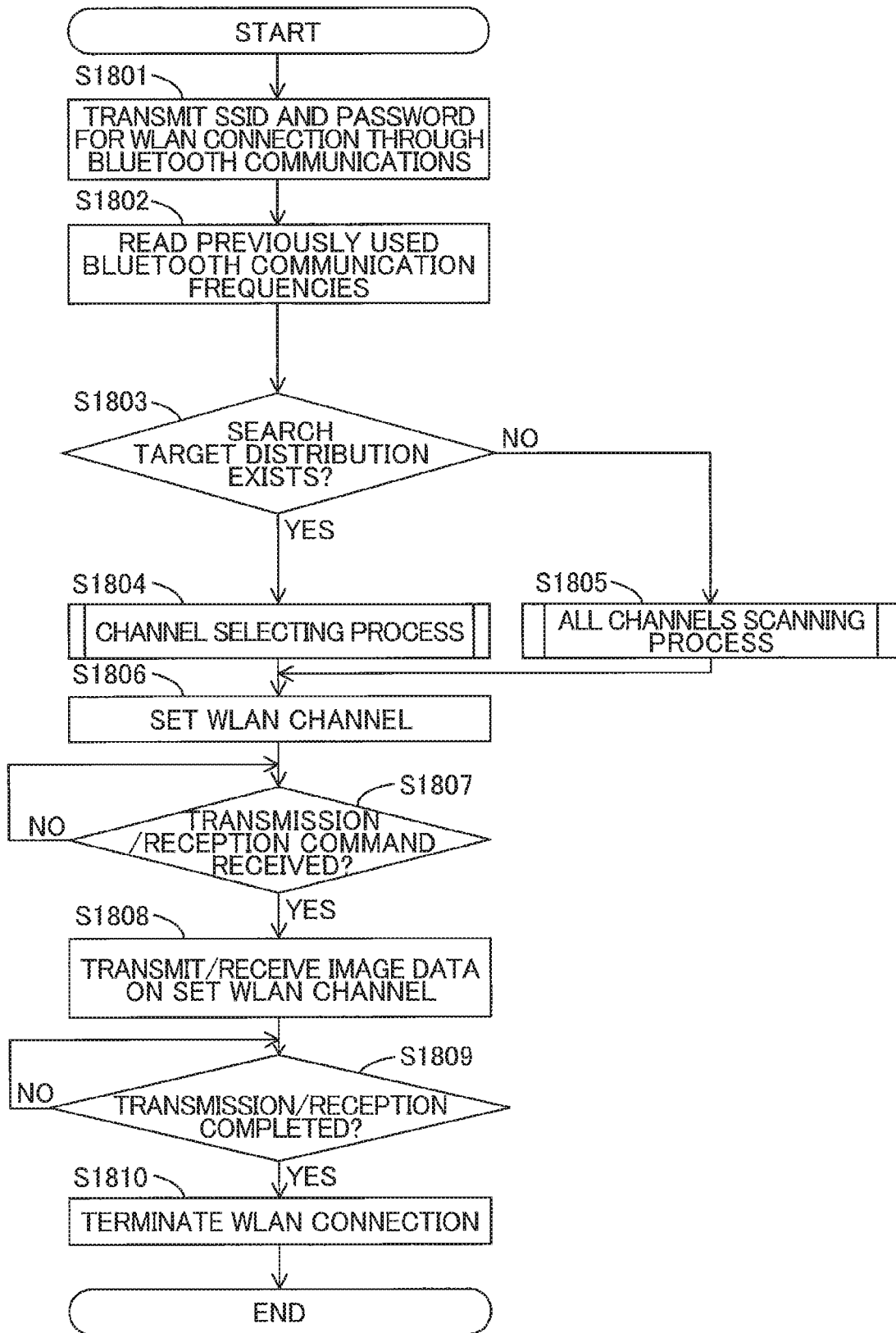
FIG. 3 is a flowchart illustrating steps in a WLAN connection process executed by the MFP.

Next, steps in the WLAN connection process executed in S18 of the main process will be described with reference to FIG. 3.

When the Bluetooth interface 16 receives a WLAN connection command from the wireless terminal 3, in S1801 the CPU 24 controls the Bluetooth interface 16 to transmit through Bluetooth communications a service set identifier (SSID) and a password necessary for a WLAN connection.

In S1802 the CPU 24 reads the previously used Bluetooth communication frequencies from the RAM 23.

In S1803 the CPU 24 determines the existence of a search target distribution within the distribution of Bluetooth communication frequencies read from the RAM 23. The search target distribution is a collection of Bluetooth communication frequencies within which no two neighboring frequencies are separated by a gap that is greater than or equal to the occupied bandwidth of a WLAN channel used for WLAN communications, and specifically by a gap that is greater than or equal to 20 MHz.

Figure 5A:
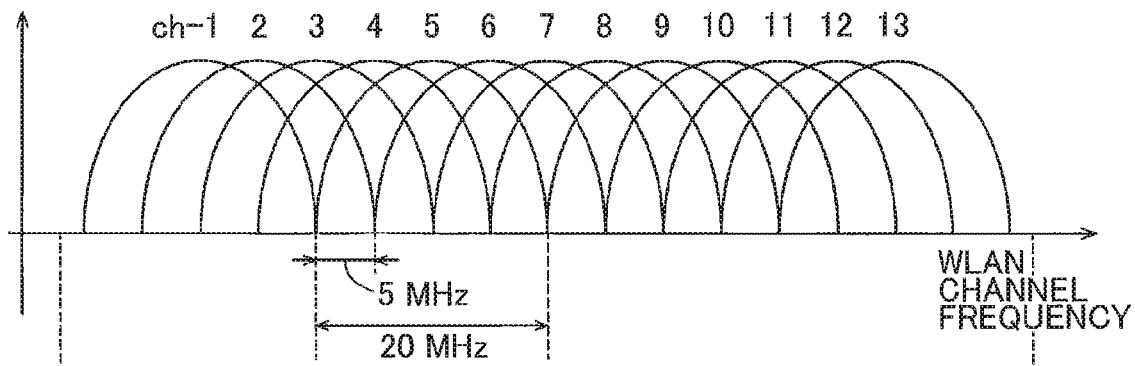
Figure 5B:
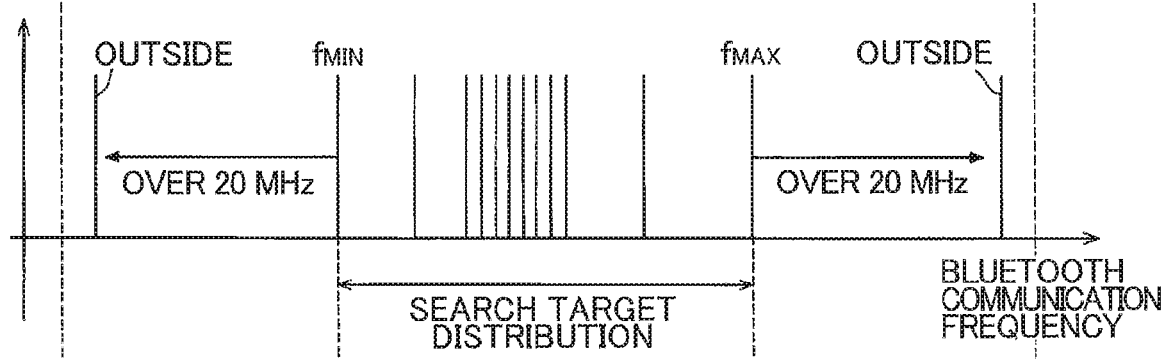

FIG. 5B illustrates a sample distribution of Bluetooth communication frequencies that were stored in the RAM 23 over time. In FIG. 5B, a collection of Bluetooth communication frequencies denoted by lines (center communication frequencies) having no gaps of 20 MHz or greater between neighboring frequencies (center communication frequencies) is the search target distribution. FIG. 5B also indicates the existence of two Bluetooth communication frequencies that fall outside of the search target distribution. One of these Bluetooth communication frequencies is separated more than 20 MHz from the minimum communication frequency of the search target distribution, and the other is separated more than 20 MHz from the maximum communication frequency of the search target distribution.

When a search target distribution such as that in the example of FIG. 5B exists (S1803: YES), in S1804 the CPU 24 executes a channel selecting process. In the channel selecting process, the CPU 24 selects a WLAN channel to be used for WLAN communications between the MFP 2 and wireless terminal 3. This process will be described later in greater detail.

If a search target distribution does not exist (S1803: NO), in S1805 the CPU 24 executes an all channels scanning process. In the all channels scanning process, the CPU 24 selects a WLAN channel to be used for WLAN communications between the MFP 2 and wireless terminal 3. This process will be described later in greater detail.

After the CPU 24 has selected a WLAN channel through either the channel selecting process or the all channels scanning process, in S1806 the CPU 24 sets the WLAN channel to be used for WLAN communications between the MFP 2 and wireless terminal 3 to the WLAN channel selected in the above process.

After setting the WLAN channel, the CPU 24 waits for receiving a transmission/reception command to transmit or receive image data. Specifically, in S1807 the CPU 24 determines whether the Bluetooth interface 16 has received a transmission/reception command and repeats this determination while a transmission/reception command has not been received (S1807: NO).

When the Bluetooth interface 16 receives a transmission/reception command from the wireless terminal 3 to transmit or receive image data (S1807: YES), in S1808 the CPU 24 controls the WLAN interface 15 to transmit or receive image data between the WLAN interface 33 of the wireless terminal 3 through WLAN communications on the WLAN channel set in S1806. As an example, when the wireless terminal 3 issues a command to execute a print job with the image-forming function of the MFP 2, image data related to this print job is transmitted from the WLAN interface 33 of the wireless terminal 3 to the WLAN interface 15 of the MFP 2 through WLAN communications on the previously set WLAN channel.

In S1809 the CPU 24 waits while transmission or reception of image data has not completed (S1809: NO). After transmission or reception of image data with the WLAN interface 15 is completed (S1809: YES), in S1810 the CPU 24 commands the WLAN interface 15 to terminate the WLAN connection between the MFP 2 and wireless terminal 3 and ends the WLAN connection process. At this time, the WLAN interface 15 terminates the WLAN connection with the WLAN interface 33.

First Example of Channel Selecting Process

Figure 4:
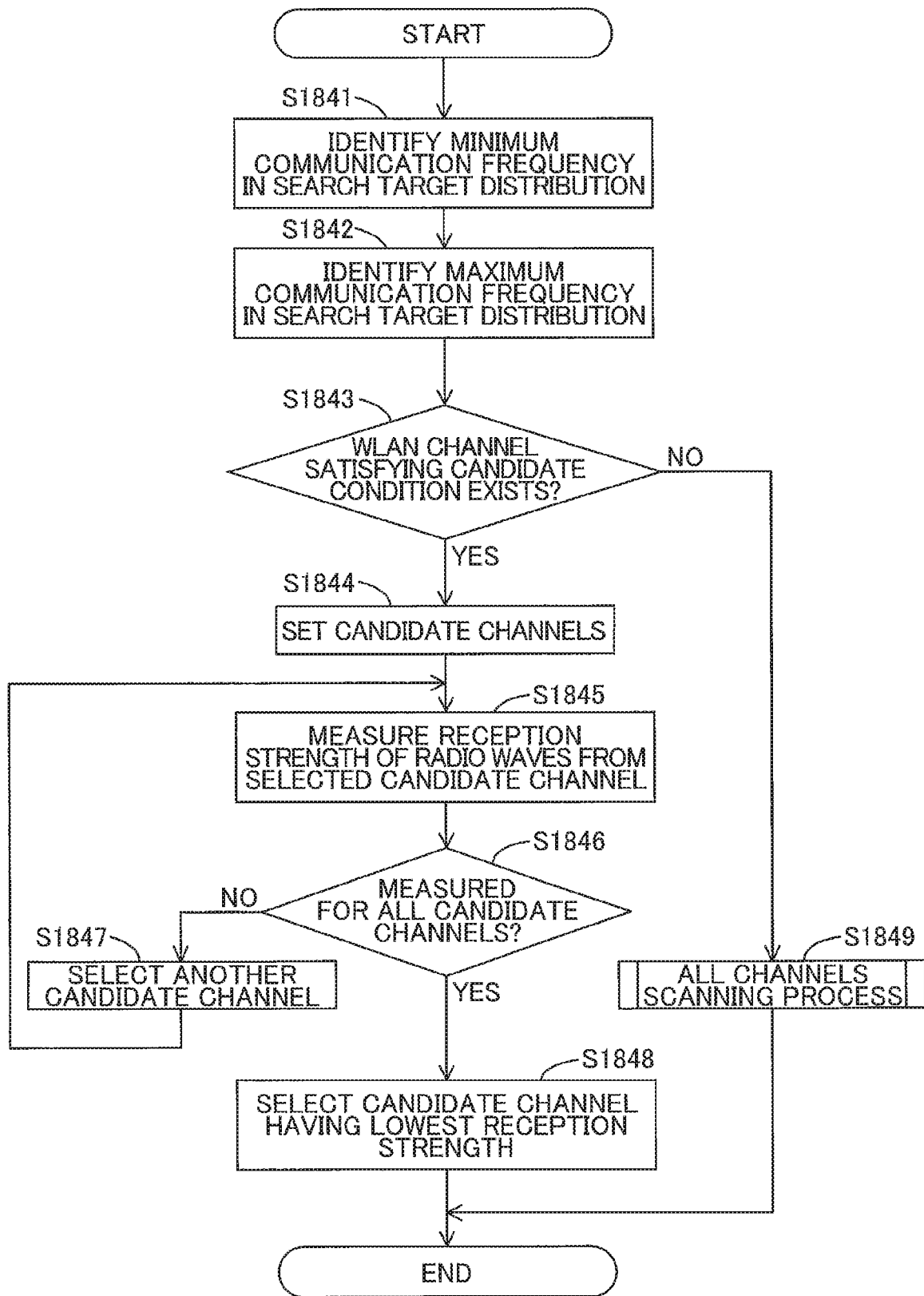
FIG. 4 is a flowchart illustrating steps in a first example of a channel selecting process executed by the MFP.

Next, steps in the channel selecting process executed in S1804 of the WLAN connection process will be described with reference to FIG. 4. FIG. 4 illustrates steps in the first example of the channel selecting process.

In S1841 at the beginning of the channel selecting process, the CPU 24 identifies the lowest Bluetooth communication frequency in the search target distribution (hereinafter simply called the "minimum communication frequency $f_{MIN}$"; indicated in FIG. 5B). The search target distribution comprises a cluster of Bluetooth communication frequencies among which neighboring frequencies are separated by less than 20 MHz.

In S1842 the CPU 24 identifies the highest Bluetooth communication frequency in the search target distribution (hereinafter simply called the "maximum communication frequency $f_{MAX}$"; indicated in FIG. 5B).

Figure 5C:
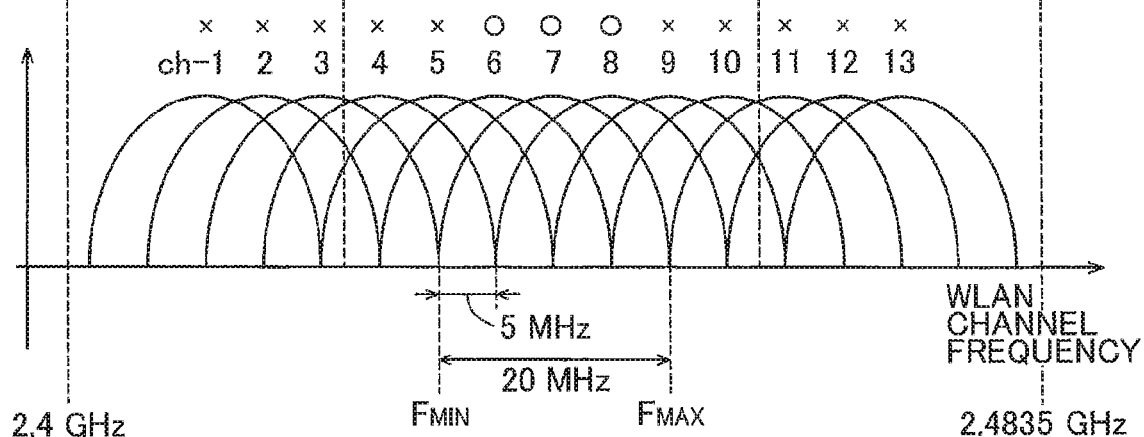

In S1843 the CPU 24 determines the existence of a WLAN channel that satisfies a candidate condition. The candidate condition requires that both the minimum frequency $F_{MIN}$ and maximum frequency $F_{MAX}$ of the occupied bandwidth for the WLAN channel be included in the search target distribution between the minimum communication frequency $f_{MIN}$ and maximum communication frequency $f_{MAX}$ (hereinafter called the "minimum-to-maximum frequency range"). In FIG. 5C, the minimum frequency $F_{MIN}$ and maximum frequency $F_{MAX}$ of the occupied bandwidth for the seventh WLAN channel from the low frequency side (ch-7) are indicated.

Using the sample distribution illustrated in FIG. 5B as the distribution of Bluetooth communication frequencies stored in the RAM 23 over time, the sixth through eighth WLAN channels from the low frequency side (ch-6 through ch-8) satisfy the candidate condition since both the minimum frequencies $F_{MIN}$ and maximum frequencies $F_{MAX}$ of the occupied bandwidth for WLAN channels ch-6 through ch-8 fall within the minimum-to-maximum frequency range.

Here, the minimum frequencies $F_{MIN}$ of the occupied bandwidth for WLAN channels ch-9 through ch-12 fall within the search target distribution (the minimum-to-maximum frequency range), but the maximum frequencies $F_{MAX}$ of the occupied bandwidth for WLAN channels ch-9 through ch-12 do not fall in this search target distribution (the minimum-to-maximum frequency range). Accordingly, none of WLAN channels ch-9 through ch-12 meets the candidate condition.

When WLAN channels satisfying the candidate condition exist (S1843: YES), in S1844 the CPU 24 selects all WLAN channels that satisfy this candidate condition as candidate channels. In the example shown in FIGS. 5A through 5C, WLAN channels ch-6 through ch-8 are set as candidate channels.

In S1845 the CPU 24 selects one of the candidate channels, controls the WLAN interface 15 to receive radio waves from the selected candidate channel, and measures the reception strength of these radio waves over a prescribed period of time.

In S1846 the CPU 24 determines whether reception strength has been measured for all candidate channels. While there remain candidate channels for which reception strength has not been measured (S1846: NO), in S1847 the CPU 24 selects one of the candidate channels that has not yet been targeted for reception strength measurements and in S1845 measures the reception strength of radio waves from the newly selected candidate channel.

When measurements of reception strength have been completed for all candidate channels (S1846: YES), in S1848 the CPU 24 selects the candidate channel having the lowest reception strength as the WLAN channel to be used for WLAN communications. Subsequently, the CPU 24 ends the channel selecting process and returns to the WLAN connection process.

On the other hand, when the CPU 24 determines in S1843 that there exist no WLAN channels satisfying the candidate condition (S1843: NO), in S1849 the CPU 24 executes the all channels scanning process (described later). After completing the all channels scanning process, the CPU 24 ends the channel selecting process and returns to the WLAN connection process.

All Channels Scanning Process

In the all channels scanning process executed in S1805 of the WLAN connection process and in S1849 of the channel selecting process, the CPU 24 sets all WLAN channels that can be used for WLAN communications as candidate channels, measures the reception strength of radio waves for each of the candidate channels, and selects the candidate channel having the lowest reception strength as the WLAN channel to be used for WLAN communications.

Figure 6:
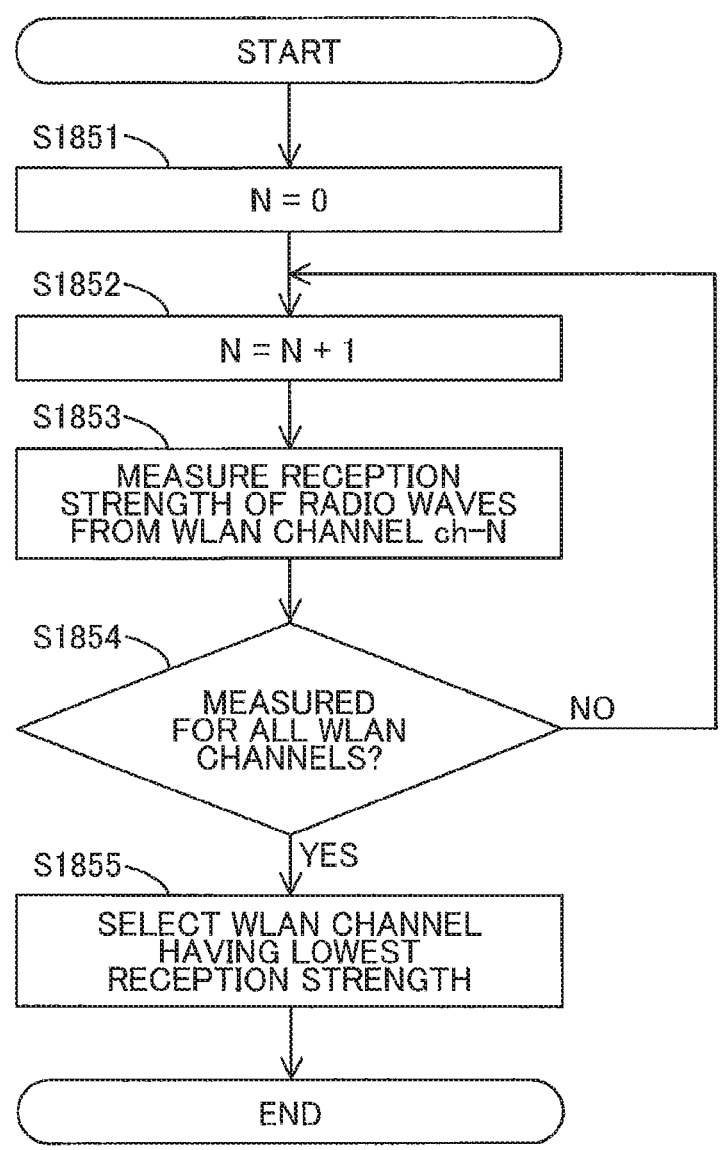
FIG. 6 is a flowchart illustrating steps in an all channels scanning process executed by the MFP.

Here, steps in the all channels scanning process will be described with reference to FIG. 6. In S1851 the CPU 24 resets a count value N for a counter provided in the RAM 23 to zero.

In S1852 the CPU 24 increments the count value N. When the count value N is zero, the CPU 24 increments the count value N to one.

In S1853 the CPU 24 controls the WLAN interface 15 to receive radio waves from WLAN channel ch-N (i.e., WLAN channel ch-1 when N=1) and measures the reception strength over a prescribed period of time.

After measuring reception strength, in S1854 the CPU 24 determines whether the reception strength of radio waves has been measured for all candidate channels (all WLAN channels that are available for WLAN communications) using the WLAN interface 15. Specifically, the CPU 24 determines whether the count value N of the counter matches the number of the WLAN channels that are available for WLAN communications. Note that the number of WLAN channels that are available for WLAN communications differs according to the communication standard used for WLAN communications from among the IEEE 802.11b standard, the IEEE 802.11g standard, and the like.

If reception strength has not been measured for all candidate channels (S1854: NO), in S1852 the CPU 24 increments the count value N and in S1553 measures the reception strength for radio waves received from the WLAN channel ch-N corresponding to the new count value N. In S1854 the CPU 24 again determines whether reception strength has been measured for all candidate channels.

Once the reception strength has been measured for all candidate channels through the WLAN interface 15 (S1854: YES), in S1855 the CPU 24 selects the candidate channel having the lowest reception strength as the WLAN channel to be used for WLAN communications. Subsequently, the CPU 24 ends the all channel scanning process and returns to the WLAN connection process.

Effects

As described above, a Bluetooth connection is first established between the MFP 2 and wireless terminal 3 in order to perform wireless communications between the MFP 2 and wireless terminal 3. While a Bluetooth connection is established between the MFP 2 and wireless terminal 3, the Bluetooth communication frequency is stored in the RAM 23. The Bluetooth communication frequency is the center communication frequency of the Bluetooth channel used for Bluetooth communications between the MFP 2 and wireless terminal 3. If the MFP 2 receives a transmission/reception command from the wireless terminal 3, the MFP 2 determines that this transmission or reception with the wireless terminal 3 should be performed using WLAN communications. Therefore, the MFP 2 establishes a WLAN connection. Therefore, the MFP 2 establishes a WLAN connection with the wireless terminal 3 and data is transmitted or received between the MFP 2 and wireless terminal 3 through WLAN communications according to the transmission/reception command. Note that the MFP 2 determines to execute WLAN communications with the wireless terminal 3 when the size of data to be transmitted or received is large, such as in the case of image data.

When establishing a WLAN connection with the wireless terminal 3, the MFP 2 checks the distribution of center communication frequencies for Bluetooth channels previously used in Bluetooth communications that are stored in the RAM 23. The MFP 2 checks this distribution for the existence of a search target distribution configured of a cluster of center communication frequencies for Bluetooth channels that are separated by less than the occupied bandwidth of a WLAN channel to be used for WLAN communications. If such a search target distribution does not exist, the MFP 2 selects one of the available WLAN channels to be the channel for WLAN communications. However, if a search target distribution does exist, the MFP 2 identifies the minimum and maximum communication frequencies $f_{MIN}$ and $f_{MAX}$ of the search target distribution, and determines whether there exist WLAN channels whose minimum and maximum frequencies $F_{MIN}$ and $F_{MAX}$ of the occupied bandwidth fall within the minimum-to-maximum frequency range.

If there are no such WLAN channels that satisfy the above condition (candidate condition), the MFP 2 selects one of the available WLAN channels to be used for WLAN communications.

A WLAN channel that satisfies the above condition (candidate condition) occupies a frequency bandwidth that includes Bluetooth channels those have been used for Bluetooth communications before the wireless connection was switched. Accordingly, this frequency bandwidth was not used for WLAN communications between other devices in the vicinity.

Therefore, when there exist WLAN channels that meet the above condition (candidate condition), all WLAN channels satisfying this condition (candidate condition) are set as candidate channels, and one of these candidate channels is selected as the channel for WLAN communications. By narrowing down the candidate channels for use in WLAN communications and selecting one of the remaining candidates as the WLAN channel to be used for WLAN communications in this way, this process can shorten the time required for selecting (searching for) a WLAN channel. As a result, this process can reduce the time required to switch from a Bluetooth connection to a WLAN connection.

Second Example of Channel Selecting Process

Figure 7:
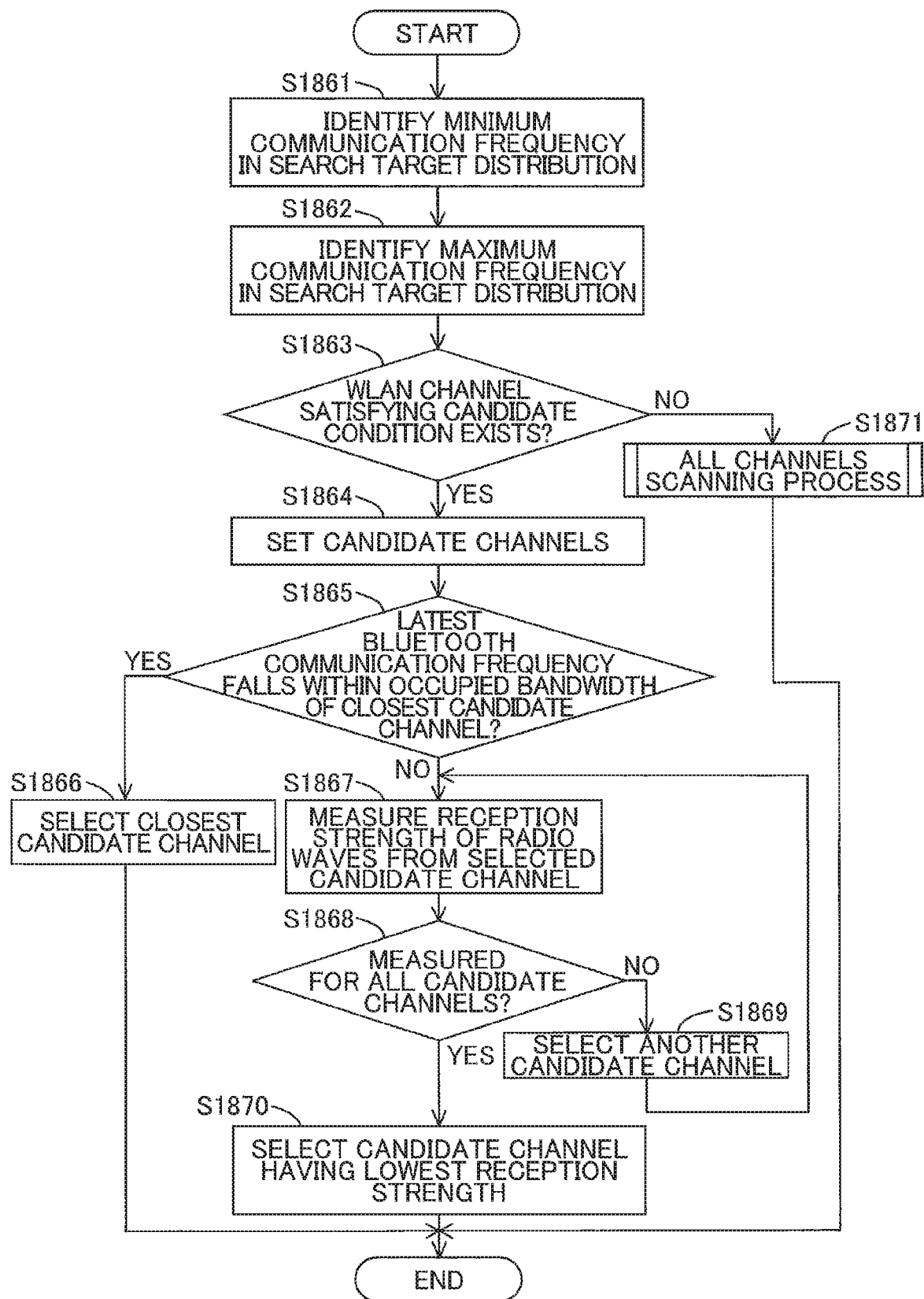
FIG. 7 is a flowchart illustrating steps in a second example of a channel selecting process executed by the MFP.

A channel selecting process illustrated in FIG. 7 may be executed in place of the channel selecting process illustrated in FIG. 4. FIG. 7 illustrates steps in the second example of the channel selecting process.

In S1861 of the channel selecting process illustrated in FIG. 7, the CPU 24 identifies the minimum communication frequency $f_{MIN}$ in the search target distribution (see FIG. 8B) configured of a cluster of Bluetooth communication frequencies separated from each other by less than 20 MHz.

In S1862 the CPU 24 identifies the maximum communication frequency $f_{MAX}$ in the search target distribution.

In S1863 the CPU 24 determines whether there exist any WLAN channels that meet the candidate condition. The candidate condition requires that both the minimum frequency $F_{MIN}$ and maximum frequency $F_{MAX}$ of the occupied bandwidth for the WLAN channel fall within the minimum-to-maximum frequency range.

If there exist any WLAN channels that satisfy the candidate condition (S1863: YES), in S1864 the CPU 24 determines these channels as candidate channels.

In S1865 the CPU 24 determines whether the latest Bluetooth communication frequency $f_{LATEST}$ falls within the occupied bandwidth for the candidate channel whose center frequency is closest to the latest Bluetooth communication frequency $f_{LATEST}$ among the candidate channels. The latest Bluetooth communication frequency $f_{LATEST}$ is the most recently stored Bluetooth communication frequency among the plurality of Bluetooth communication frequencies stored in the RAM 23. The candidate channel whose center frequency is closest to the latest Bluetooth communication frequency $f_{LATEST}$ is hereinafter called the "closest candidate channel". That is, the CPU 24 determines whether the latest Bluetooth frequency $f_{LATEST}$ falls within a range defined by the minimum frequency $F_{MIN}$ and maximum frequency $F_{MAX}$ of the occupied bandwidth for the closest candidate channel.

If the latest Bluetooth communication frequency $f_{LATEST}$ falls within the occupied bandwidth for the closest candidate channel (S1865: YES), that is, if the latest Bluetooth communication frequency $f_{LATEST}$ takes a value between the minimum frequency $F_{MIN}$ and maximum frequency $F_{MAX}$ of the occupied bandwidth for the closest candidate channel (S1865: YES), in S1865 the CPU 24 selects this closest candidate channel as the WLAN channel to be used for WLAN communications. Subsequently, the CPU 24 ends the channel selecting process and returns to the WLAN connection process.

Figure 8A:
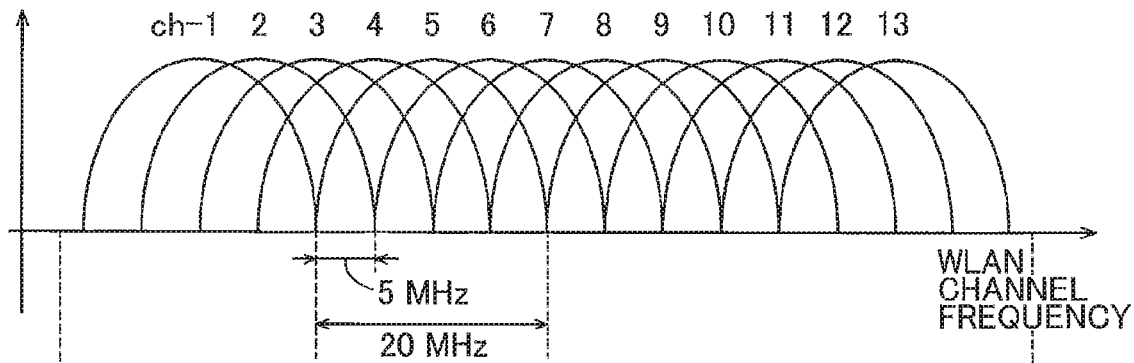
Figure 8B:
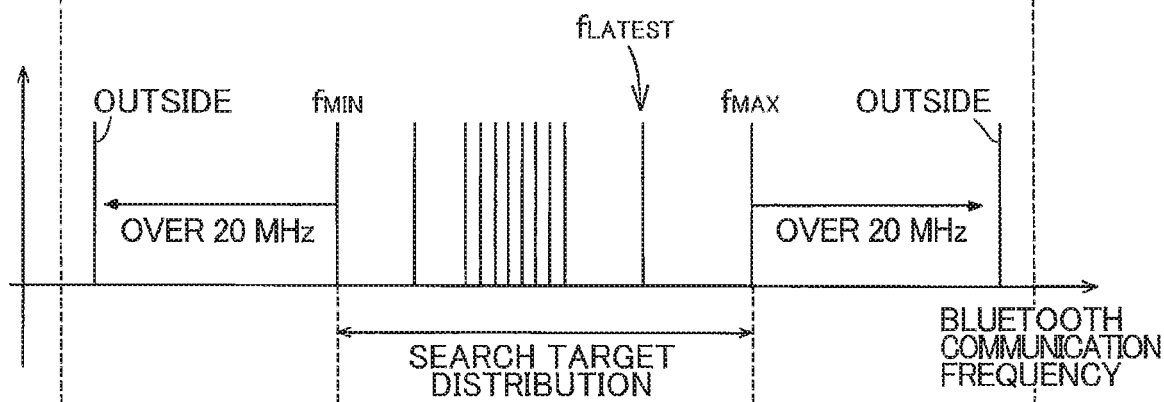

Using the sample distribution illustrated in FIG. 8B as the distribution of Bluetooth communication frequencies stored in the RAM 23 over time, WLAN channels ch-6 through ch-8 satisfy the candidate condition because both of their minimum and maximum frequencies $F_{MIN}$ and $F_{MAX}$ of the occupied bandwidth fall within the minimum-to-maximum frequency range. Here, the WLAN channels ch-6 through ch-8 are the sixth through eighth channels in order from the lowest frequency. Thus, the CPU 24 sets the WLAN channels ch-6 through ch-8 to the candidate channels.

Figure 8C:
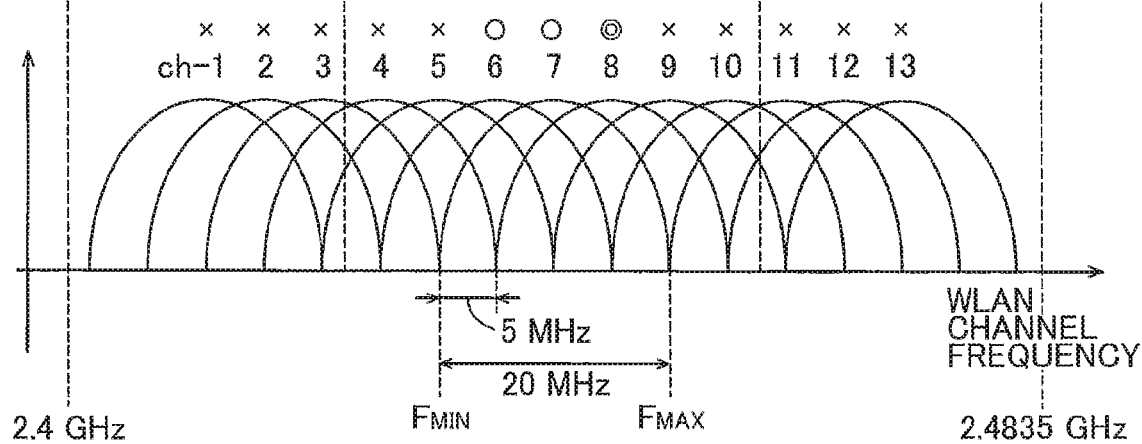

In the sample distribution illustrated in FIG. 8B, the WLAN channel ch-8 is the closest channel closest to the latest Bluetooth communication frequency $f_{LATEST}$ among the candidate channels. Since the latest Bluetooth communication frequency $f_{LATEST}$ falls within the occupied bandwidth for the WLAN channel ch-8 as illustrated in FIGS. 8A through 8C, the CPU 24 selects the WLAN channel ch-8 as the WLAN channel to be used for WLAN communications in this case.

If the latest Bluetooth communication frequency $f_{LATEST}$ does not fall within the occupied bandwidth for the closest candidate channel (S1865: NO), that is, if the candidate channel whose center frequency is closest to the latest Bluetooth communication frequency $f_{LATEST}$ among the candidate channels determined in S1864 does not fall within the range defined by the minimum frequency $F_{MIN}$ and maximum frequency $F_{MAX}$ of the occupied bandwidth for the closest candidate channel, in S1867 the CPU 24 selects one of the candidate channels, controls the WLAN interface 15 to receive radio waves from the selected candidate channel, and measures the reception strength over a prescribed period of time.

In S1868 the CPU 24 determines whether the reception strength has been measured for all candidate channels. While there remain candidate channels to be measured (S1868: NO), in S1869 the CPU 24 selects another candidate channel to be subjected to reception strength measurements, and in S1867 measures the reception strength of the newly selected candidate channel.

After the CPU 24 has completed measurements of reception strength for all candidate channels using the WLAN interface 15 (S1868: YES), in S1870 the CPU 24 selects the candidate channel having the lowest reception strength as the channel to be used for WLAN communications. Subsequently, the CPU 24 ends the channel selecting process and returns to the WLAN connection process.

However, if the CPU 24 determines in S1863 that there exist no WLAN channels that satisfy the candidate condition (S1863: NO), in S1871 the CPU 24 executes the all channels scanning process of FIG. 6 in which all WLAN channels available for WLAN communications are set as candidate channels. After completing the all channels scanning process, the CPU 24 ends the channel selecting process and returns to the WLAN connection process.

Effects

Through the channel selecting process shown in FIG. 7, the WLAN channel (closest candidate channel) whose center frequency is closest to the latest Bluetooth communication frequency $f_{LATEST}$ among the WLAN channels (candidate channels) those minimum and maximum frequencies $F_{MIN}$ and $F_{MAX}$ fall within the minimum-to-maximum frequency range has the least probability of being used by another wireless station if the latest Bluetooth communication frequency $f_{LATEST}$ falls within the occupied bandwidth for this WLAN channel (closest candidate channel). By selecting this WLAN channel to be used for WLAN communications, it is possible to reduce the time required for setting the WLAN channel. However, even if the latest Bluetooth communication frequency $f_{LATEST}$ does not fall within the occupied bandwidth for this WLAN channel (closest candidate channel), one channel is selected for use in WLAN communications not from all channels but from the candidate channels which has been previously selected from among all channels. Thus, the time required for setting the WLAN channel can be reduced. Therefore, this method can reduce the time required for switching from a Bluetooth connection to a WLAN connection.

Third Example of Channel Selecting Process

A channel selecting process illustrated in FIG. 9 may be executed in place of the channel selecting process illustrated in FIG. 4. FIG. 9 illustrates steps in the third example of the channel selecting process. In the channel selecting process illustrated in FIG. 9, the processes in S1844 through S1848 of the channel selecting process illustrated in FIG. 4 are replaced with a process in S1884.

Figure 10A:
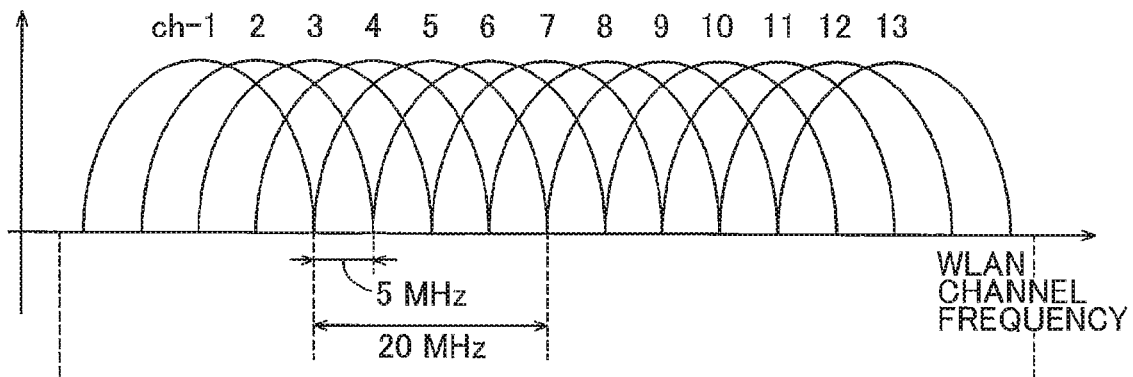
Figure 10B:
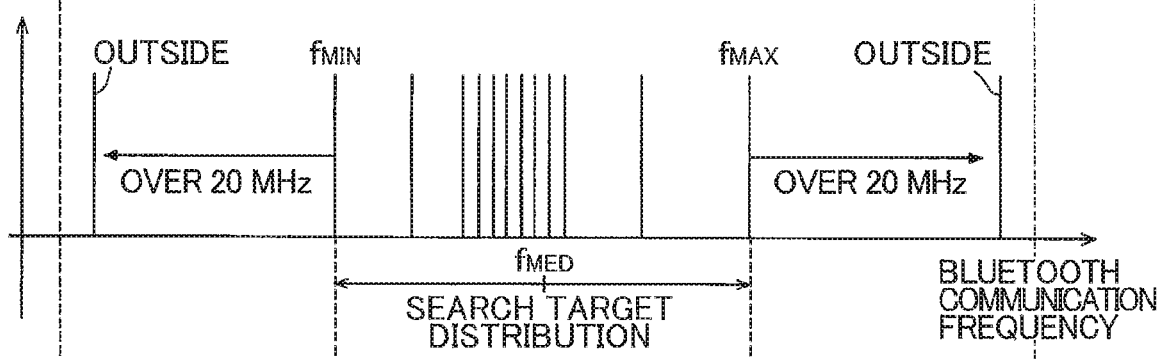
Figure 10C:
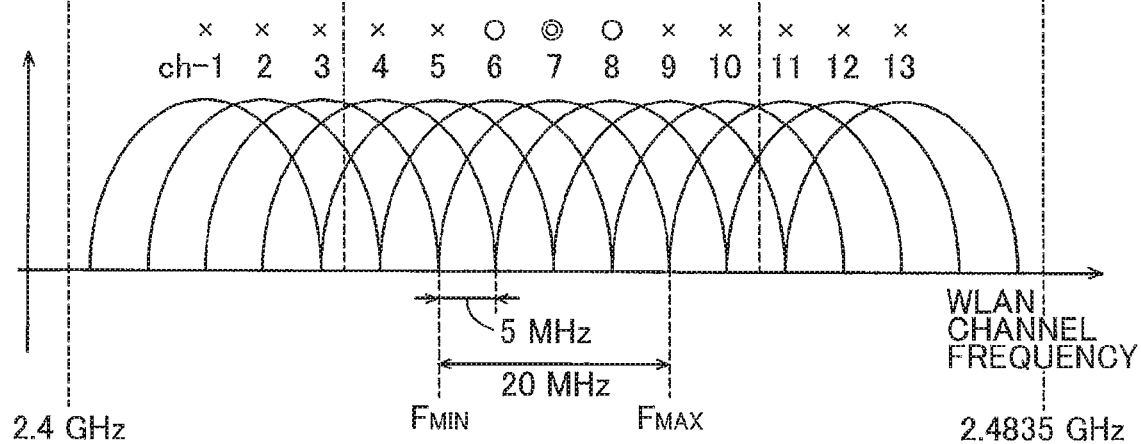

In S1881 of the channel selecting process illustrated in FIG. 9, the CPU 24 identifies the minimum communication frequency $f_{MIN}$ in the search target distribution configured of a cluster of Bluetooth communication frequencies separated from each other by less than 20 MHz (see FIG. 10B).

In S1882 the CPU 24 identifies the maximum frequency $f_{MAX}$ of the search target distribution.

In S1883 the CPU 24 determines whether there exist any WLAN channels that satisfy the candidate condition. The candidate condition requires that both the minimum and maximum frequencies $F_{MIN}$ and $F_{MAX}$ of the occupied bandwidth for the WLAN channel fall within the minimum-to-maximum frequency range.

If there exist WLAN channels that satisfy this candidate condition (S1883: YES), in S1884 the CPU 24 sets the WLAN channel to be used for WLAN communications to the WLAN channel whose center frequency is closest to the median $f_{MED}$ of the minimum-to-maximum frequency range. Subsequently, the CPU 24 ends the channel selecting process and returns to the WLAN connection process.

Using the sample distribution illustrated in FIG. 10B as the distribution of Bluetooth communication frequencies stored in the RAM 23 over time, WLAN channels ch-6 through ch-8 satisfy the candidate condition because both of their minimum and maximum frequencies $F_{MIN}$ and $F_{MAX}$ of the occupied bandwidth fall within the minimum-to-maximum frequency range. Here, the WLAN channels ch-6 through ch-8 are the sixth through eighth channels in order from the lowest frequency. Since among the center frequencies of the WLAN channels ch-6 through ch-8 satisfying the candidate condition, the center frequency of WLAN channel ch-7 is closest to the median $f_{MED}$ of the minimum-to-maximum frequency range illustrated in FIG. 10B, the CPU 24 sets WLAN channel ch-7 as the WLAN channel to be used for WLAN communications.

However, if there exist no WLAN channels that satisfy the candidate condition (S1883: NO), in S1885 the CPU 24 executes the all channels scanning process of FIG. 6. After completing the all channels scanning process, the CPU 24 ends the channel selecting process and returns to the WLAN connection process.

Effects

Through the channel selecting process of FIG. 9, when both the minimum and maximum frequencies $F_{MIN}$ and $F_{MAX}$ of the occupied bandwidth for the WLAN channel whose center frequency is closest to the center of the search target distribution (the median $f_{MED}$ of the minimum-to-maximum frequency range) fall within this search target distribution, this WLAN channel is set to be used for WLAN communications. Accordingly, this method can reduce the time required to set the WLAN channel, thereby reducing the time required to switch from a Bluetooth connection to a WLAN connection.

Fourth Example of Channel Selecting Process

Figure 11:
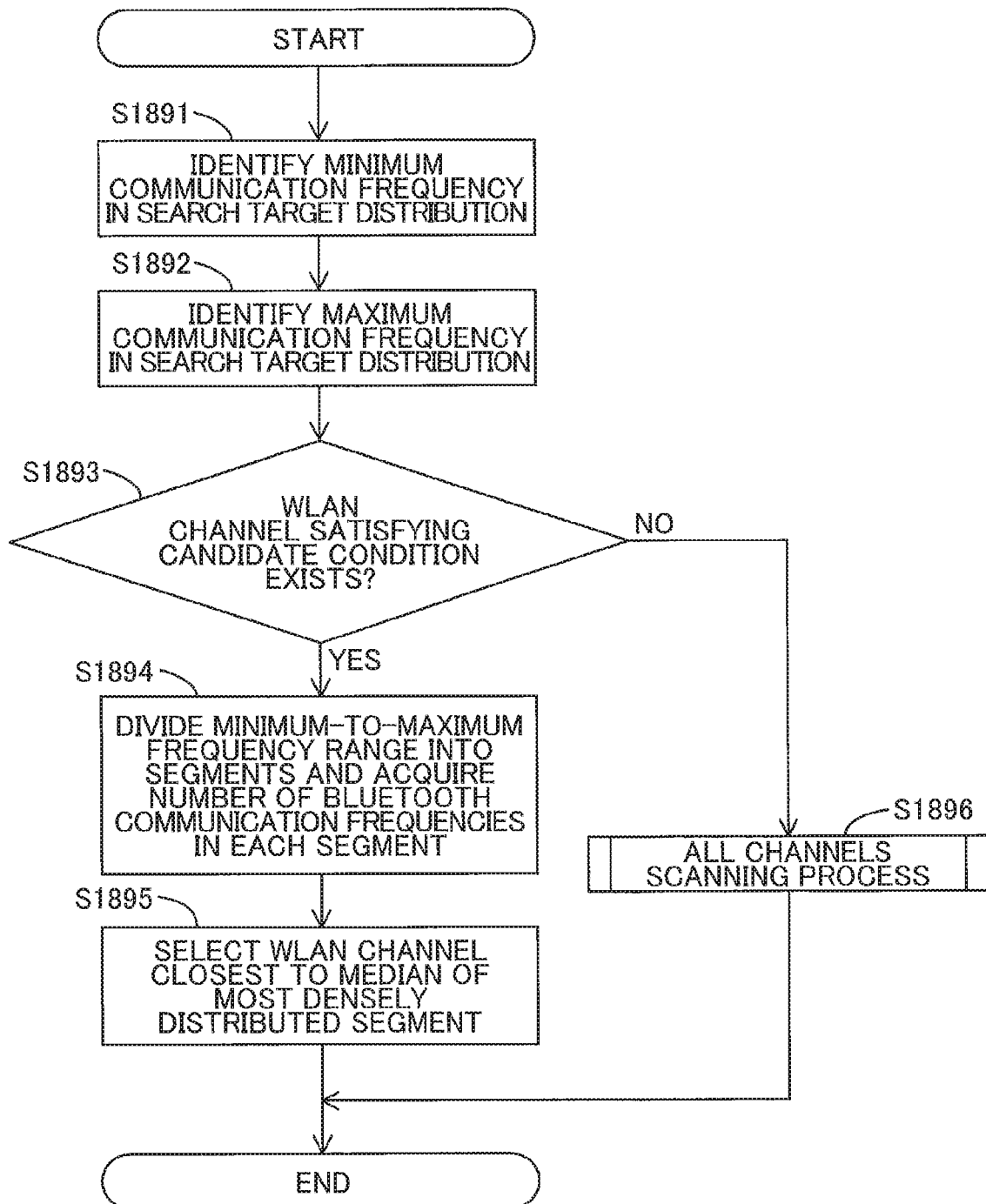
FIG. 11 is a flowchart illustrating steps in a fourth example of a channel selecting process executed by the MFP.

A channel selecting process illustrated in FIG. 11 may be executed in place of the channel selecting process illustrated in FIG. 4. FIG. 11 illustrates steps in the fourth example of the channel selecting process. In the channel selecting process illustrated in FIG. 11, the processes in S1844 through S1848 of the channel selecting process illustrated in FIG. 4 are replaced with processes in S1894 and S1895.

Figure 12A:
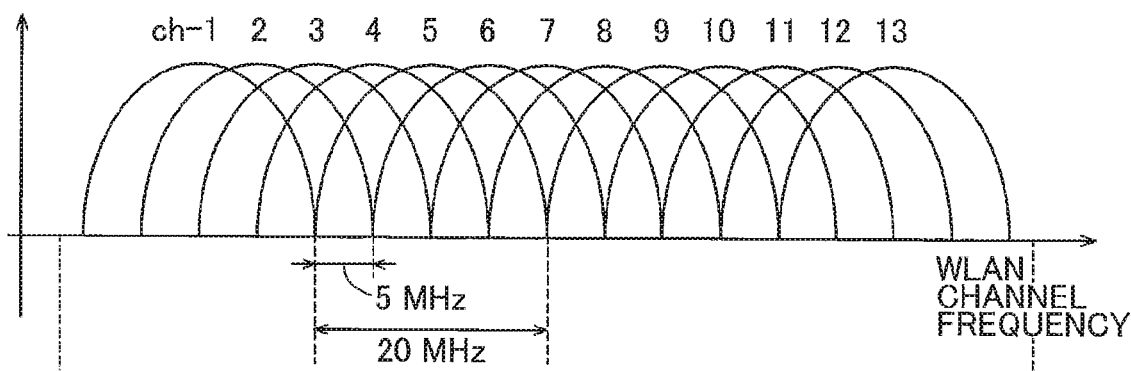
Figure 12B:
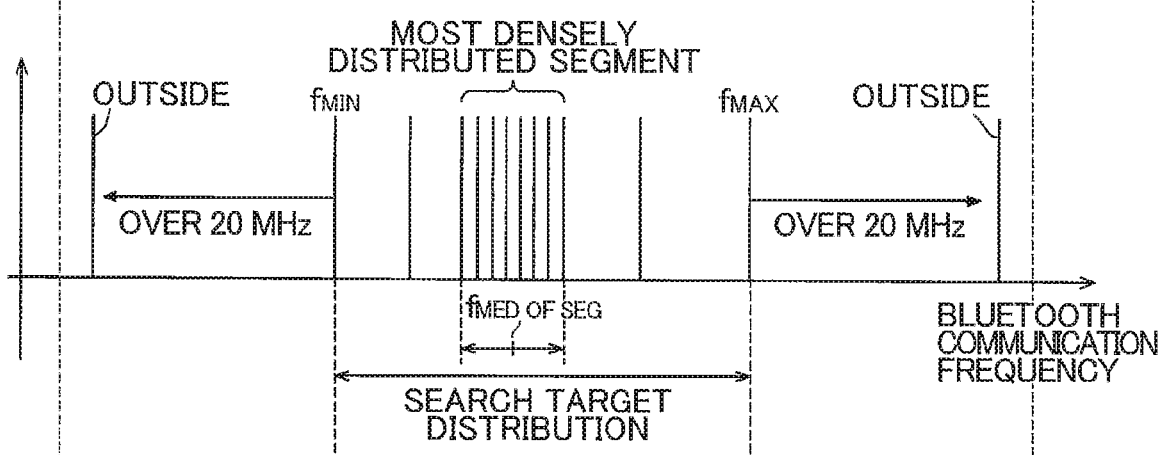
Figure 12C:
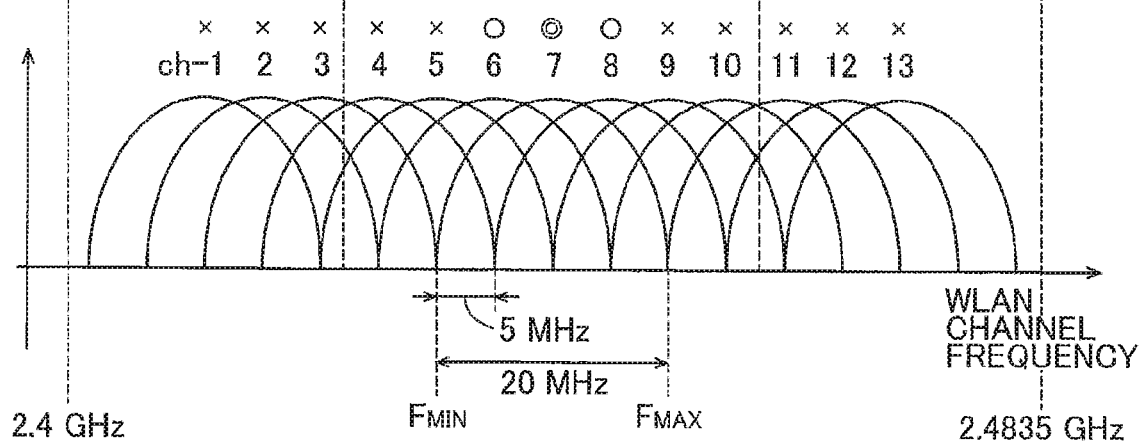

In S1891 of the channel selecting process illustrated in FIG. 11, the CPU 24 identifies the minimum communication frequency $f_{MIN}$ of the search target distribution configured of a cluster of Bluetooth communication frequencies separated from each other by less than 20 MHz (see FIG. 12B).

In S1892 the CPU 24 identifies the maximum communication frequency $f_{MAX}$ of the search target distribution.

In S1893 the CPU 24 determines whether there exist any WLAN channels that satisfy the candidate condition. The candidate condition requires that both the minimum and maximum frequencies $F_{MIN}$ and $F_{MAX}$ of the occupied bandwidth for the WLAN channel fall within the minimum-to-maximum frequency range.

If there exist WLAN channels that satisfy this candidate condition (S1893: YES), in S1894 the CPU 24 divides the minimum-to-maximum frequency range into segments of 20 MHz, equivalent to the occupied bandwidth of each WLAN channel, and acquires the number of Bluetooth communication frequencies from the RAM 23 that fall within each segment.

In S1895 the CPU 24 sets the WLAN channel to be used for WLAN communications to the WLAN channel whose center frequency is nearest the median $f_{MED\_OF\_SEG}$ of the frequency bandwidth of the segment for which the largest number of Bluetooth communication frequencies was acquired, i.e., the segment in which Bluetooth communication frequencies are most densely distributed (most densely distributed segment). Subsequently, the CPU 24 ends the channel selecting process and returns to the WLAN connection process.

Using the sample distribution shown in FIG. 12B as the distribution of Bluetooth communication frequencies stored in the RAM 23 over time, WLAN channels ch-6 through ch-8 satisfy the candidate condition requiring that both the minimum and maximum frequencies $F_{MIN}$ and $F_{MAX}$ of the occupied bandwidth for the WLAN channel fall within the minimum-to-maximum frequency range. Here, the WLAN channels ch-6 through ch-8 are the sixth through eighth channels in order from the lowest frequency. Since the center frequency of WLAN channel ch-7 is closest to the median $f_{MED}$ OF SEG of the most densely distributed segment in which Bluetooth communication frequencies are most densely distributed within the minimum-to-maximum frequency range, the CPU 24 selects WLAN channel ch-7 to be the WLAN channel to be used for WLAN communications.

However, if there exist no WLAN channels that satisfy the candidate condition (S1893: NO), in S1896 the CPU 24 executes the all channels scanning process of FIG. 6. After completing the all channels scanning process, the CPU 24 ends the channel selecting process and returns to the WLAN connection process.

Effects

Through the channel selecting process of FIG. 11, the WLAN channel whose center frequency is closest to the median of the segment in which Bluetooth communication frequencies are most densely distributed is selected as the WLAN channel to be used for WLAN communications. Accordingly, this method can reduce the time required to set the WLAN channel, thereby reducing the time required to switch from a Bluetooth connection to a WLAN connection.

Variations of the Embodiments

While the description has been made in detail with reference to the specific embodiment thereof, it would be apparent to those skilled in the art that many modifications and variations may be made thereto without departing from the spirit of the disclosure, the scope of which is defined by the attached claims.

For example, the ASIC 21 may include a plurality of CPUs that work in concert to execute each process.

What is claimed is:

1. A device comprising:
a first wireless communication interface configured to perform first wireless communications with an external device using a first communication channel, the first communication channel being determined from among a plurality of first channels, each of the plurality of first channels occupying a first frequency bandwidth ranging from a minimum frequency to a maximum frequency within a predetermined frequency band;
a second wireless communication interface configured to perform second wireless communications with the external device using a second communication channel, the second communication channel being determined from and switched among a plurality of second channels depending on radio wave environment, each of the plurality of second channels occupying a second frequency bandwidth smaller than the first frequency bandwidth within the predetermined frequency band, the second communication channel having a center communication frequency, the center communication frequency of the second communication channel being a median of the second frequency bandwidth occupied by the second communication channel;
a storage; and
a controller configured to perform:
storing in the storage the center communication frequency of the second communication channel used for the second wireless communications and picked up every prescribed time interval while the second wireless communication interface is performing the second wireless communications with the external device, the storage being configured to store a plurality of center communication frequencies;
selecting a plurality of communication frequencies from among the plurality of center communication frequencies stored in the storage, the plurality of communication frequencies being a plurality of consecutive center communication frequencies ranging from a minimum communication frequency to a maximum communication frequency, the plurality of center communication frequencies including the plurality of communication frequencies and at least one remaining center communication frequency, two neighboring communication frequencies within the plurality of communication frequencies being separated from each other by less than the first frequency bandwidth, each of the at least one remaining center communication frequency being separated from any of the plurality of communication frequencies by at least the first frequency bandwidth;
determining a search target range, the search target range being defined by the minimum communication frequency and the maximum communication frequency; and
determining the first communication channel from among at least one first channel satisfying a candidate condition, the candidate condition requiring that both the minimum frequency and the maximum frequency of each of the at least one first channel fall within the search target range.

2. The device according to claim 1, wherein the determining the first communication channel comprises:
determining all of the at least one first channel as at least one candidate channel; and
determining the first communication channel from among the at least one candidate channel.

3. The device according to claim 2, wherein the controller is configured to further perform measuring reception strength of radio waves from each of the at least one candidate channel after the at least one candidate channel is determined, and
wherein a lowest candidate channel is determined as the first communication channel, the reception strength of the radio waves from the lowest candidate channel being lowest among the reception strength of the radio waves from respective ones of the at least one candidate channel.

4. The device according to claim 2, wherein the controller is configured to further perform determining whether a latest communication frequency falls within the first frequency bandwidth occupied by a closest candidate channel, the latest communication frequency being stored in the storage most recently among the plurality of center communication frequencies, the at least one candidate channel having respective ones of at least one center frequency, the closest candidate channel having a closest center frequency closest to the latest communication frequency among the at least one center frequency, and
wherein the closest candidate channel is determined as the first communication channel in response to determining that the latest communication frequency falls within the first frequency bandwidth occupied by the closest candidate channel.

5. The device according to claim 2, wherein a closest candidate channel is determined as the first communication channel, the at least one candidate channel having respective ones of at least one center frequency, each of the at least one center frequency being a median of the first frequency bandwidth occupied by a corresponding one of the at least one candidate channel, the closest candidate channel having a closest center frequency closest to a median of the search target range among the at least one center frequency.

6. The device according to claim 2, wherein the controller is configured to further perform:
dividing the search target range into a plurality of segments, each of the plurality of segments occupying the first frequency bandwidth, each of the plurality of communication frequencies being included in one of the plurality of segments, each of the plurality of segments having a channel number indicating number of communication frequencies included in the each of the plurality segments; and determining one segment having a largest channel number among the plurality of segments, the one segment having a median of the first frequency bandwidth occupied by the one segment, and wherein a closest candidate channel is determined as the first communication channel, the closest candidate channel having a closest center frequency closest to the median of the one segment among the at least one candidate channel.

7. The device according to claim 2, wherein the plurality of first channels is determined as the at least one candidate channel in a case where the search target range does not exist.

8. The device according to claim 2, wherein the plurality of first channels is determined as the at least one candidate channel in a case where there exists no first channel satisfying the candidate condition.

9. The device according to claim 1, wherein the controller is configured to further perform:

transmitting a searching signal for the second wireless communications via the second wireless communication interface;

establishing a second wireless connection between the second wireless communication interface and the external device using the second communication channel in response to a response signal responsive to the searching signal from the external device via the second wireless communication interface; and determining to switch the second wireless communications to the first wireless communications in response to a transmission/reception command from the external device via the second wireless communication interface, and wherein the first communication channel is determined in response to determining to switch the second wireless communications to the first wireless communications.

10. The device according to claim 9, further comprising an image processor configured to perform processing image data, and wherein the transmission/reception command instructs transmitting to and receiving from the external device the image data.

\* \* \* \* \*